United States Patent

[11] 3,590,989

| [72] | Inventor | John C. Wittwer |
| | | RFD #2, Mount Kisco, N.Y. 10549 |
| [21] | Appl. No. | 782,157 |
| [22] | Filed | Dec. 9, 1968 |
| [45] | Patented | July 6, 1971 |

[54] PROTECTIVE BOTTLE DISPLAY AND SHIPPING CONTAINER
4 Claims, 6 Drawing Figs.

[52] U.S. Cl. .................................................. 206/47,
215/6, 220/20
[51] Int. Cl. ................................................ B65d 79/00
[50] Field of Search .......................................... 215/6;
206/47

[56] References Cited
UNITED STATES PATENTS
2,374,092  4/1945  Glaser ................................. 215/6
FOREIGN PATENTS
614,764  2/1961  Canada ............................... 215/6

*Primary Examiner*—Joseph R. Leclair
*Assistant Examiner*—John M. Caskie
*Attorney*—Hopgood and Calimafde

ABSTRACT: A clear plastic container having a base configured to define an item-receiving compartment having an open end. Shock absorbing material is introduced into the open lower end after which the lower end is sealed. The item is carried within the sealed recess is thus protected against shock and vibration during handling and transmit.

PATENTED JUL 6 1971
3,590,989
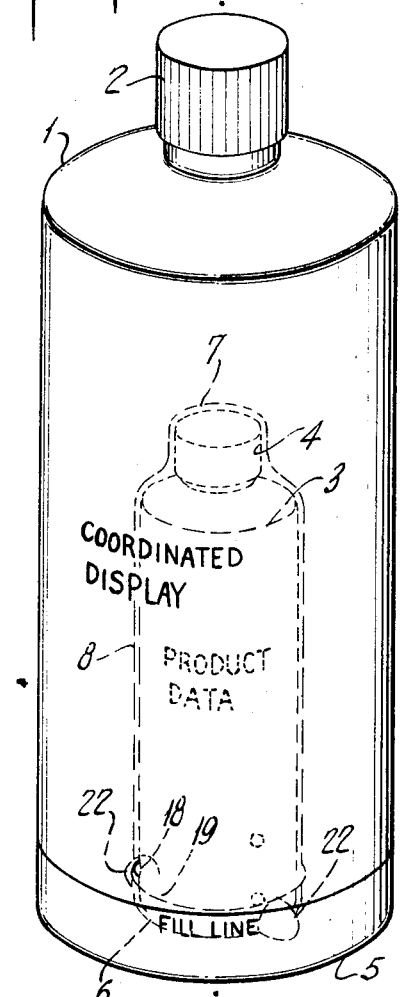
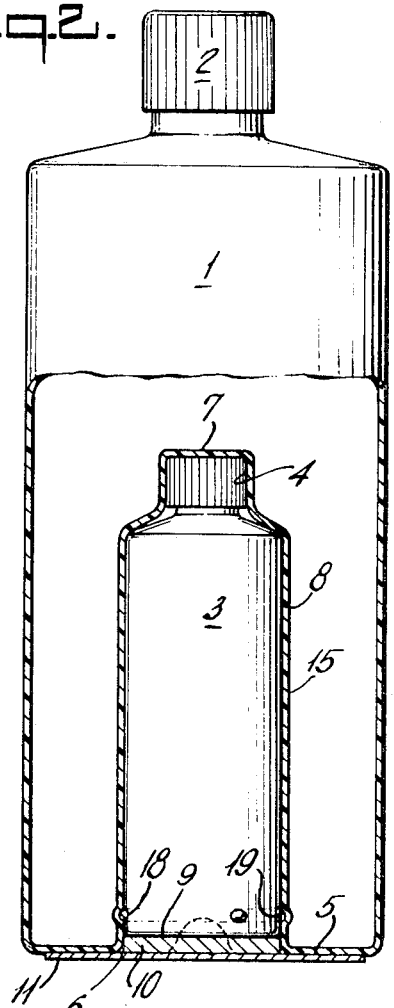
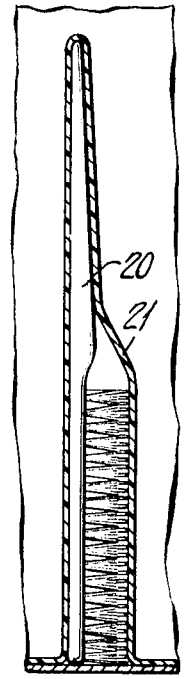
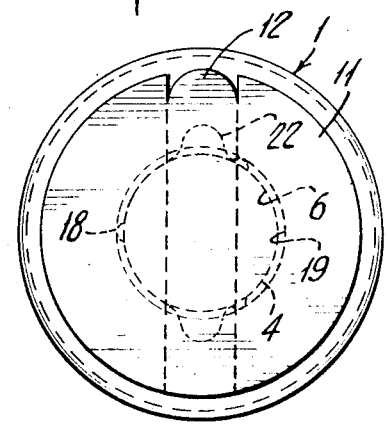
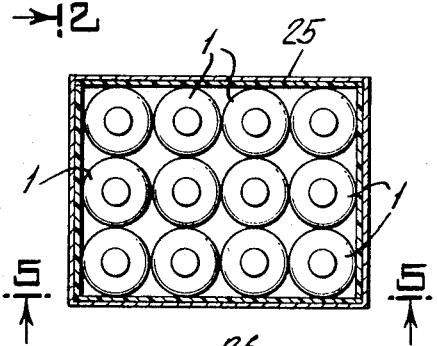
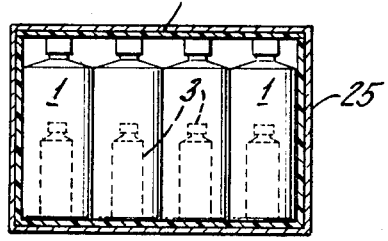
INVENTOR
JOHN C. WITTWER
BY
Hopgood & Calimafde
ATTORNEYS

PROTECTIVE BOTTLE DISPLAY AND SHIPPING CONTAINER

The invention is of a clear plastic bottle, the bottom of which extends into the interior of the bottle and is molded to the contour of a smaller container or item to be inserted therein for protection during shipping and display. The resiliency of the outer bottle protects the inner container during shipment, and its transparency permits observation of the inner item and markings thereon in conjunction with markings on the outside of the bottle.

BACKGROUND

The development of clear plastic materials suited for making bottle-type containers has opened the door to new developments in the container art. This invention is one such development in that, for the first time, it at once constitutes a protective shipping container and an attractive merchandising display.

While plastic bottles themselves are good unbreakable containers, some substances, for chemical reasons, cannot be packaged in plastics having the desired resilient qualities to function as a shipping container. For example, certain chemicals would dissolve the plastic materials most suitable for use as containers. For this reason it is desirable to combine the inert quality of a glass container with the resiliency of a plastic container. At the same time, it is much more economical to ship chemicals and other liquids the concentrated state and mix them with water at the destination, rather than pay freight on the water used to dilute the solution.

This invention facilitates the shipment of concentrated chemicals in a small glass container securely stored within a plastic outer bottle, which also provides a lightweight mixing container quite capable of holding a dilute solution of the chemical involved.

The ability to mold bottles of clear plastic material in the manner of the invention has only recently been acquired; and only since then has it been possible to construct a device having the characteristics of the invention.

It is an objective of the invention to provide a resilient, plastic bottle, shock resistant, having a compartment therein molded to accept a smaller frangible container or object.

It is a further objective of the invention to provide a combination bottle and shipping container having a compartment configured to removably retain a smaller container for storage or shipment.

It is a still further objective of this invention to provide a resilient, clear plastic outer bottle having a compartment extending inwardly from the bottom thereof to receive a second bottle, through which markings on the second bottle may be clearly viewed, either along or in conjunction with markings on the outer bottle.

It is another, and still further, objective of this invention to provide a shipping container and display combination for small containers of corrosive chemicals, which shipping and display container also constitutes a mixing and storage container for a dilute solution of the chemicals shipped.

SUMMARY

Briefly, the invention comprises a substantially air tight container formed of clear plastic material, having resilient qualities which render the container shock absorbent and highly resistent to breakage. The base of the container is depressed into the interior thereof forming a protective compartment. The compartment is molded to the exterior shape of an item to be placed therein, and is anchored at the open end to the resilient base of the container forming a cantilevered structure capable of absorbing great lateral shock.

Markings on the small interior container are clearly visible through the outer container, and a means to control the registry of the inner container with the outer container assures the coordination of markings on the inner container with markings on the outer container.

Means are also provided for retaining the inner container within the outer container, said means also providing shock absorbing protection at the bottom of the compartment.

The invention has the following advantages. It permits combining the expense of packing of frangible containers of corrosive materials, with the expense of providing a proper container within which a working solution of said materials may be prepared.

Another advantage of the invention is that, while providing the aforementioned economic and functional advantages, the containers as combined constitute an attractive merchandising display. Another advantage of the invention is that it provides protective storage for such frangible containers in the hands of the consumer.

Other objectives, advantages, and various further features of novelty and invention will be pointed out or will occur to those skilled in the art from a reading of the following specification in conjunction with the accompanying drawings.

BRIEF DESCRIPTION OF THE DRAWINGS

FIG. 1 is a perspective view of a container of the invention configured to receive, and having, a bottle in place therein.

FIG. 2 is a cross-sectional view taken along line 2–2 of FIG. 1.

FIG. 3 is a bottom view of the device illustrated in FIG. 1.

FIG. 4 is a top view of a shipping carton filled with one type of container of the invention.

FIG. 5 is a side view of FIG. 4 taken along line 5–5 thereof.

FIG. 6 is a perspective view of a modification of the invention having a premium item enclosed in the container.

DETAILED DESCRIPTION OF THE INVENTION

Referring now to FIG. 1, the invention is seen embodied in the form of a cylindrical container 1, having a removable top 2. The container 1 is made of a resilient, clear plastic material such as polyvinylchloride. Container 1 has been molded around the shape of an interior smaller container 3, creating a recess 4 therein which conforms closely to the contour of container 3. It is not necessary that container 3 be a body of revolution, as container 1 can be molded to conform to irregular protrusions from container 3 such as the irregularities of a dispenser-type cap.

Recess 4 creates an aperture 6 in bottom 5 of container 1. Aperture 6 is sized to receive container 3 so that container 3 may be inserted into and withdrawn from recess 4. With container 1 so formed, when container 3 is inserted into recess 4, it is supported at the top and sides by the top and sidewalls 7 and 8, respectively, of recess 4.

FIG. 2 is a cross-sectional view of the invention as illustrated in FIG. 1. FIG. 2 further illustrates a means for retaining container 3 within recess 4. Initially, recess 4 is made deep enough so that when container 3 is inserted therein, space will exist between the bottom 9 of container 3 and the bottom 5 of container 1. Container 3 is then retained within recess 4 by inserting within the aforementioned space a layer 10 of shock-absorbent material such as cardboard or foam plastic. Such a layer is illustrated in FIG. 3 as a disc 10. Disc 10 and container 3 are held in place within recess 4 by a seal 11 which covers aperture 6 of recess 4 and adheres to the bottom 5 of container 1. A tear strip 12, incorporated in seal 11 facilitates the breaking of the seal to permit the removal of disc 10 and container 3.

Container 1, together with disc 10 and seal 11, function as a shipping container for inside container 3. With disc 10 inserted as described in the bottom of recess 4, container 1 comprises a structurally sound enclosure which, by virtue of being made of resilient material, is capable of absorbing almost any shock short of a crushing blow, and of sustaining considerable distortion even over long periods of time.

As illustrated in FIG. 2, the top 7 and sidewalls 8 which form recess 4 are anchored to the bottom 5 of container 1 around the periphery of aperture 6, forming a cantilever structure 15 anchored to the bottom 5 of container 1. Bending moments exerted upon structure 15 by the inertia of container 3 when container 1 is subjected to lateral shock will be transmitted to and absorbed by container 1. In addition, the size relationship between containers 1 and 3 should be such that a liberal amount of space exists between the walls of container 1 and the walls of structure 15, so that depression of the walls of container 1 by an amount reasonably to be anticipated, will still not result in contact with the inner structure 15. Similarly, the aforementioned space should be sufficient to eliminate the possibility of the interior structure 15 being deflected by movement against the inside wall of container 1. The protection thus afforded the container or item placed in recess 4, permits frangible objects to be stored therein for shipment, and for display as will appear below.

A further feature of the invention is illustrated in FIG. 1 wherein the coordination of pictorial or printed matter upon the inner container 3 with similar matter on the outer container 1 is illustrated. Inner container 3 can be positioned precisely within recess 4 by the incorporation of a vertical registry ridge protruding from the bottom side of container 3. By aligning this ridge with a matching detent in the interior surface of recess 4, the position of container 3 within recess 4 can be predetermined. By coordinating artistic or printed matter on the outside container 1 with similar matter on interior container 3, a unique and attractive mercantile display can be created.

According to the invention, container 1 can perform a further useful function, it may be used as a mixing container in which to prepare a working solution of a concentrate container in inner container 3. This use is particularly significant in instances where the solution so mixed must be used and cannot be stored.

It is also envisioned that container 3 may be stored in and repeatedly removed from recess 4. In order to facilitate such storage, means are provided to retain container 3 in recess 4, after seal 11 has been broken. Such means may take the form of small lugs 18 which protrude from the bottom sides of container 3 and engage an annular depression 19 in the inside wall of recess 4. Finger cavities 22, consisting of small recesses in the opposite sidewalls of recess 4 where they communicate with aperture 6, and shaped to accommodate the tip of one's thumb and forefinger, provide access to container 3 for removal.

FIGS. 4 and 5 illustrate a manner in which the invention as illustrated in FIG. 1, may be packed in a rectangular multi-unit shipping carton 25. FIG. 4 is a top view of a rectangular carton into which twelve of the containers of FIG. 1 have been fitted so that lateral movement of the containers is eliminated. FIG. 5 is a side view of the packing carton illustrated in FIG. 4, taken along line 5–5 of FIG. 4, and illustrates the relative positioning of containers 3 within the group of shipping containers 1 as illustrated in FIG. 4. Within such grouping, each interior container 3 is not only protected by its own exterior container, but also by the exterior containers of surrounding items and the sides 26 of the packing carton.

The space between the inner structure 15 and the outer walls of container 1 may be void or filled with a fluid or other substance of light to medium density without impairing the protective qualities of container 1. However, it must be borne in mind that, if the outer container is filled with an opaque liquid or substance, the artistic effect of seeing one container within another will necessarily be lost. However, this does not negate the usefulness of the device as it may be desirable to ship the two substances involved together, one of which can be used to protect the other.

It will occur to those skilled in the art from a reading of the foregoing specification that, aside from the obvious restrictions of shape and size, any item can be stored in recess 4. For example, a premium or giveaway item as illustrated in FIG. 6 can be placed therein which would be visible and attractive to a customer.

In FIG. 6, a small brush 20 is shown in place in an inner compartment 21 molded to the general outer contour of the brush, but shaped to permit its upright insertion into compartment 21.

While the principles of the invention have been described in connection with the above specific apparatus it is to be clearly understood that this description is made only by way of example and not as a limitation to the scope of the invention as set forth in the accompanying claims.

What I claim is:

1. A shipping enclosure combination for shipping a breakable item comprising a closable substantially airtight container made of rigid but resilient plastic material, said container having a compartment recessed therein to receive said breakable item, said compartment being elongated and open at one end, and having sidewalls which terminate at said open end with a wall of said container, shock absorbent means to fit into the open end of said compartment, and sealing means to seal the open end of said compartment, said container being made of a clear plastic material, and wherein said recessed compartment is integral with said container and molded to the general exterior shape of said item inserted therein, so that said item fits snugly within said compartment, said recessed compartment extending inwardly from the bottom of said container and along the vertical axis thereof, with the sides of said compartment substantially set apart from the sides of said container, and wherein the periphery of said open end falls substantially within the peripheral edge of the bottom of said container, so that said compartment is a cantilever structure supported at one end by the bottom of the said container, and said breakable item has shock absorbing means on all sides thereof.

2. The combination of claim 1, wherein said item is a glass bottle filled with a selected substance, and wherein said enclosure is an empty plastic bottle suitable for mixing and storing a solution of said substance.

3. The combination of claim 1, wherein said enclosure and item have complementary markings thereon which are visible from the outside of said enclosure, and retaining means to provide a selected registry between said enclosure and item.

4. The combination of claim 3, in which said retaining means comprise protruding lugs on one of said enclosure and item, and complementary mating depressions in the other one of said enclosure and item.